April 17, 1951 C. W. BRYAN 2,549,570
SURFACE CONDITIONING TOOL
Filed April 9, 1946 2 Sheets-Sheet 2
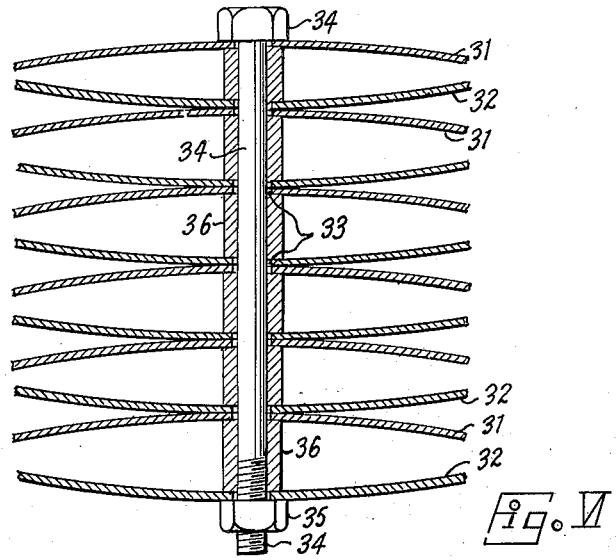
Fig. VI
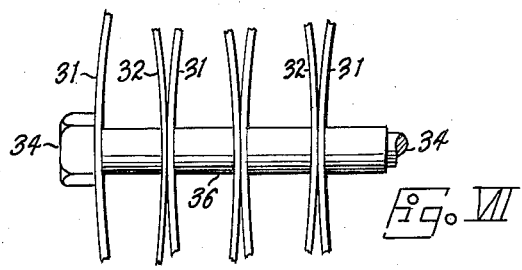
Fig. VII
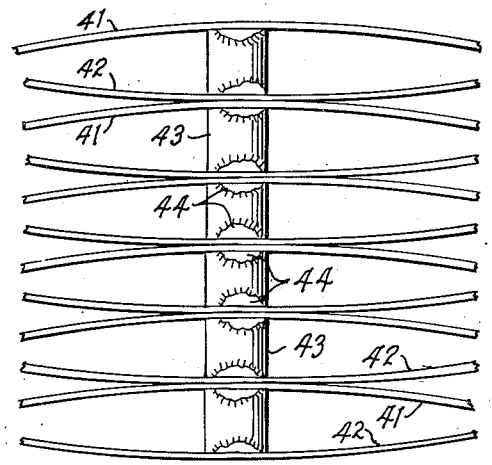
Fig. VIII
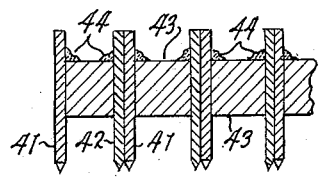
Fig. IX
Carroll W. Bryan
INVENTOR.
BY
ATTORNEY Patented Apr. 17, 1951

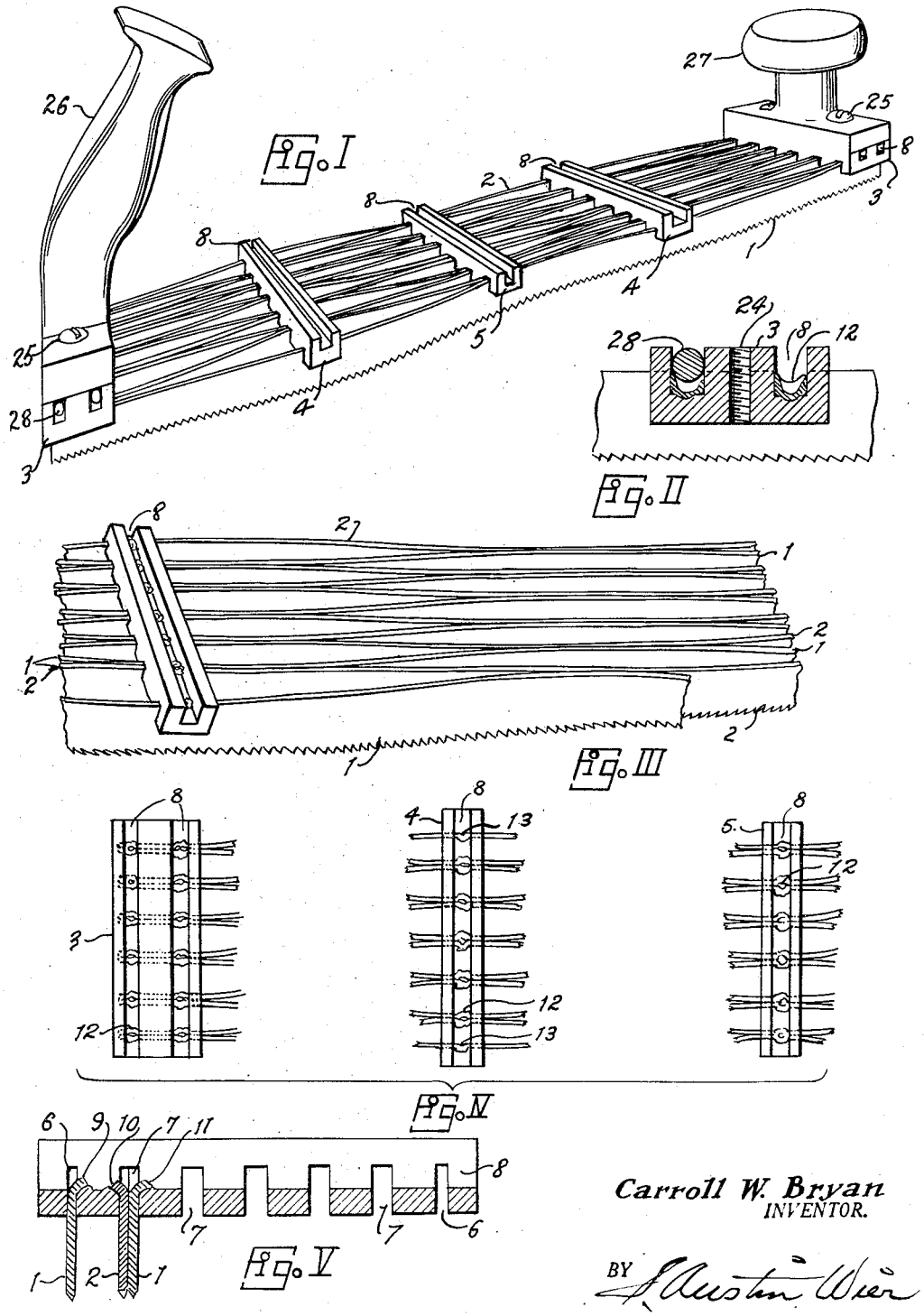

2,549,570

UNITED STATES PATENT OFFICE 2,549,570

SURFACE CONDITIONING TOOL

Carroll W. Bryan, Dallas, Tex., assignor of one-half to S. Austin Wier, Dallas, Tex.

Application April 9, 1946, Serial No. 660,802

2 Claims. (Cl. 29—78)

This invention has to do with a tool for conditioning surfaces to render more uniform their contour. It is primarily concerned with smoothing the surfaces of materials which may be metal, wood, plastic or other substances. It presents a serrated surface for this purpose. The tool operates on a new principle of surface conditioning; and it may be regarded as roughly analogous to a file or plane, without being either. The tool employs the use of a plural number of saws which are spaced and disposed in non-parallel relations; and the teeth of the several saws are disposed in a substantially common plane, so that when the tool is passed over a surface to be worked the movement of the saws in unison will result in a leveling and conditioning of the surface so that it is rendered clean and reduced to a uniform contour of predetermined character; and in such operation there is not left any troughs or grooves such as ordinarily appear in the use of the common type of sawing operations. This is so because the serrations in this tool are peculiarly its own.

The use of this tool eliminates the less desirable and now obsolete practice of filing the surfaces to be conditioned, or planing them, or subjecting them to abrasion through the use of emery cloth or sand-paper, or by grinding.

It has been found that in the filing of surfaces, and especially metallic surfaces, such operation is slow, labored and irregular, depending upon the direction of the movement of the file, the pressure maintained thereon and whether the operation is done manually or by mechanical means.

Frequently there is marked irregularity in the cuts made by old style cutting instruments. Ordinarily the cutting surfaces are disposed in fixed angulation or inclination with the result that there is a deeper or greater cut made when the tool moves in one direction (usually the forward direction) than when it is made to operate in the reverse direction. This often results in an irregularity in dressing down the surface; and it is also common to find tools "bucking" when operated in the direction of the deepest cut, and "sliding" when moved in the reverse direction. These objections are obviated by this invention.

The use of saw blades in parallel relation is plainly unsatisfactory because of the grooving of the surface which results in a pattern of ridges paralleled by troughs.

When an abrasive disc is used, as in a power sander, the whirling disc moves at far greater speed at its perimeter than near its center, with the result that there is an irregularity in the cutting down by these separate parts of the disc. Furthermore, such a disc wears out rapidly near its edge and before the center part thereof is used up; and such a disc has to be discarded before all of its potential cutting surface has been employed. Another objection to the rotating disc is found in the clogging by dust and particles cut from the surface being conditioned; and this greatly reduces the cutting power of the disc. The same is true of the conventional file.

None of the old methods here indicated have been found to present a tool sufficiently flexible to follow the general contour of all of the surface to be conditioned; and the result is that where either a convex or concave surface is to be dressed down the higher parts thereof are disproportionately cut away, changing to that extent the original contour which is desired to be preserved.

Among the objects of the instant invention are these:

1. Uniformity in the depth and degree of the cut taken on the surface being conditioned so that the original contour thereof is preserved.

2. A tool which will cut to the same degree and in the same manner when moved backward as when it is moved forward.

3. The use of a plural or gang assembly of saws so disposed in non-parallel relation that grooving is eliminated.

4. Each alternate blade of a series of saws being reversed, so that the angle of inclination of saw teeth in one blade is opposite to the angle of inclination of the saw teeth in the adjoining blade, thus at all times allowing a cut to be made of uniform depth, and further allowing the same character of cut to be made whether the blade moves in one direction or the other.

5. Such a non-parallel disposition of the several saw blades that there is a uniform dressing of the surface to be conditioned regardless of the direction or angle at which the tool is moved over the surface, whether forward, backward, or obliquely.

6. A surfacing tool of considerable flexibility which may be flexed over surfaces which are not flat and still result in a uniform conditioning of such surfaces.

7. A surfacing tool which will not clog up and in which the teeth thereof do not become fouled from cuttings made thereby, there being generous open spaces between the blades for the greater part of their length.

8. A surfacing hand tool provided with a propelling handle at one end and a holding handle at the other, and the handles being so attached that they may be reversed, to lengthen the cutting life of the tool.

9. A surface conditioning tool which is provided with handles for manual operation, and the handles being replaceable with means for adapting the tool to power operation, allowing the use of a power operating tool which will not "chatter."

10. A surface conditioning tool employing a multiple number of saw blades in which means are employed to affix the blades, either permanently or removably, to an element which will maintain the blades in a pattern of spaced and non-parallel relationship.

A suitable and preferred form of the device is disclosed in the accompanying drawings from which departure may be made and still embrace the spirit of the invention; and these drawings include the following:

Fig. I represents a perspective view in which the tool is fully assembled for hand operation.

Fig. II shows a cross-section of the members holding the blades at each end of the tool.

Fig. III shows a partially cut away view in perspective of a section of the tool taken intermediate its ends, and in which is disclosed alternately disposed blades having their teeth in opposite directions.

Fig. IV is a plan view of blade keepers seen from above, in which is shown a double keeper at the end of the blades and two intermediate keepers, and in which is disclosed deformity or crimping to secure the blades to the keepers.

Fig. V is a cross-section of a typical keeper showing the top of each blade to be deformed by crimping to secure the blade in place.

Fig. VI discloses an alternate view in section of means for spacing the blades, employing bolts and washers.

Fig. VII shows a partial plan view of the disclosure in Fig. VI.

Fig. VIII discloses an alternate view of means for spacing the blades, employing welding for affixing blades.

Fig. IX is a sectionalized elevation of part of blade assembly shown in Fig. VIII.

In the drawings the various parts and elements of this device are indicated by numerals, and the numeral 1 indicates a blade having teeth disposed in one direction, and the numeral 2 indicates a blade having teeth disposed in the opposite direction. There is obvious advantage in having alternate blades so disposed as to present teeth in opposite directions. However, it must be borne in mind that this tool can be assembled with blades having teeth disposed in the same general direction.

The blades are held in spaced relation of non-parallel character by the use of keepers. A terminal keeper 3 is placed at each end of the tool to hold and carry the blades. This keeper is usually made wider than the intermediate keepers 4 and 5. All keepers are provided with slots in their under-side; and slot 6 is arranged near the outer end of alternate keepers 4 and it is so constructed as to receive a single blade.

Wide slots 7 are provided in all keepers so as to carry two blades in each slot; and keeper 5 is provided with wide slots altogether, since it does not carry a single blade on each end as is the case with keepers 4.

All keepers are provided on their upper sides with grooves 8, running long way of the keepers; and these grooves are cut deep enough to allow the back edges of the blades to extend up into the grooves, where these back edges may be deformed to secure them to the keepers and to hold them firmly in their respective slots.

An indication of one of several means for securing these blades in place is shown in Fig. II, and again in Fig. V. Blade 1 is crimped as at 9 and typical blades 2 and 1, carried by a typical slot 7 may be crimped or deformed as at 10 and 11 respectively.

Any character of deformity effected and worked upon the back edge of the blades will serve to secure them to the keepers. For instance, after the blades have been arranged in proper non-parallel relation and inserted in the slots designed to carry them and maintain them in such relation, a pointed tool, such as a punch or chisel or other spreading or cutting tool, may be inserted in groove 8 and smartly driven against and/or between the blades which are exposed therein, so as to deflect, deform or spread these blades and prevent their removal from the keeper. A typical condition of such deformity is shown as at 12 and 13.

However, it is to be noted that the securing of these blades to means which will maintain them in properly spaced relation of non-parallel character may be effected by the use of welding, as shown in Fig. VIII and in Fig. IX or by the use of bolts through the blades, carrying spacers between the blades, as shown in Fig. VI and in Fig. VII, or in some other suitable manner.

In one alternate form of blade assembly the numeral 31 indicates a typical blade with teeth in one direction, and 32 is a typical blade with teeth in the opposite direction. A collection of blades may be thus assembled to make the tool any desired width; and each pair of adjoining blades presents teeth in opposed directions. All of these blades comprising a full assembly may be provided with holes 33 therethrough and in alignment, so that these holes may receive bolt 34 which is fitted with nut 35.

Washers or spacers 36 are fitted around the bolts and between the blades to hold the latter in the desired spaced relation. The spaces between the blades, and the shapes of these spaces as defined by any pair of blades in juxtaposition, may be made more irregular by causing some of the spacers 35 to vary in length; and thus there may be achieved a more irregular pattern between the blades. The most suitable pattern to be found in the most efficient tool is that in which the blades are never parallel. Bearing such fact in mind, the blade assembly may be put together with such varied and differing patterns as may please the maker and user of this device, the character of the work to be done being considered.

Blade pattern variation may be further carried out by the use of still different means employed to connect and hold the blades in spaced relation; and one such arrangement is that indicated in the drawings of another alternate form wherein numerals 41 and 42 represent blades with oppositely disposed teeth, but these blades are not drilled to receive bolts for holding them together. Such blades may be kept in any desired spaced relation by the use of block spacers 43 placed between the blades. These block spacers may be made of any suitable material. However, metal blocks are very satisfactory for this purpose. They may be welded to the blades through the use of appropriately placed welds, as at 44.

By varying the thickness and shape of spacer blocks 43 many different patterns for the disposition of the saw blades can be created.

Whatever may be the type of means employed for spacing and holding blades to define any required pattern, it is to be noted that appropriate handles are to be attached to the completed blade assembly whenever the tool is to be hand operated.

The terminal keepers 3, shown in Figs. II and III, may be drilled and tapped for screw threads to receive machine screws 25 for attaching the handles of the tool to these terminal keepers. In this manner there may be attached the rear handle 26 for pushing the tool, and the front handle or knob 27 for guiding it and regulating its pressure upon the surfaces to be conditioned.

Obviously any suitable handles or other attachments may be made to this tool for holding and moving it and for directing it. The forms indicated are merely among the satisfactory forms of such handles, and any others effecting the same purposes may be employed.

The top edges of the blades shown in Figs. I to V, inclusive, will be found to appear within the lower parts of grooves 8; and within these grooves in the terminal keepers 3 there may be placed threaded rods 28. These rods are so disposed in the grooves that the threads will press upon the back edges of the blades (whether the latter are deformed or not). Such pressure is secured and maintained by having rods 28 to extend very slightly above the upper surfaces of the keepers 3, so that when the tool handles are drawn down firmly against these upper surfaces by tightening machine screws 25 the top edges of the blades and the threads on the rods become emmeshed, and they are driven and held tightly together. This rod construction is designed and used to prevent the blades from getting loose in the terminal keepers. Such construction will fixedly maintain the blades in proper position so that they cannot then rattle or move.

Any predetermined and desired blade pattern may be worked into a blade assembly and there maintained by fixing them temporarily in a suitable clamp or jig which will define the pattern. Then with the serrated edges of the blades upturned, the backs of the blades may be thrust into a melted or semi-solid material, such as a suitable plastic material, which will harden and hold the blades. Thus there may be cast upon the blades an appropriately fitting back, which may be provided with handles. This back may be made of material which will be flexible when finished.

In the manufacture and assembly of my device I find that a suitable and practical procedure is substantially as follows:

I take thin, flexible saw blades, having teeth of the suitable number per lineal inch and made with proper hardness for the work to be undertaken; and I cut these blades into appropriate lengths. Usually these blades are provided with teeth directed from the body of the blade at a predetermined angle. I then place one blade in proper position for assembly and with its teeth pointed toward one end of the tool being made. The next blade I reverse, and cause the teeth thereof to be pointed towards the opposite end of the tool. Every other blade then appears to have its teeth inclined in the manner indicated for the number one blade; and between each such there will be found an alternating blade with teeth pointing in the other direction.

It is highly desirable that these blades be not arranged in parallel relation, but they must have a spaced relation. A convenient way to provide for this is to arrange spacing means at convenient intervals along the tool. At one such interval the spacing means will cause the number one blade on the outside to be deflected outwardly from the median or center line of the tool. At the next interval appropriate means may be arranged to bring the outside blade closer to such median line. At the very next interval this blade is thrust outwardly again. This arrangement is repeated with each succeeding blade placed in the tool, until there is a series of blades so arranged, fixed and maintained that when any two blades are considered in juxtaposition they will be found to alternately converge and separate, converge again and separate again.

Such arrangement results in the multitudinous teeth of the entire tool to be so disposed that no one tooth tracks exactly the tooth immediately in front of it when the tool is moved forward over the surface to be dressed. The net result of the tooth pattern of the completed tool is that there is a uniformity in the cutting of the surface to be conditioned, and the cut taken is equally distributed over the entire surface covered by the tool in its movement. Such arrangement and operation prevents irregularities in cutting, and it especially prevents grooving or channeling of the surface. It also prevents the tool from digging in, jumping or chattering when it is moved over the surface being conditioned. This arrangement also means that the tool cuts equally well and uniformly when drawn backward as when pushed forward.

The means employed to maintain these alternately disposed saw blades in a general pattern of repeated convergence and separation, or at least in a non-parallel arrangement, may be any means suitable for the purpose.

In Figs. I to V inclusive I have indicated as suitable means the keepers 3, 4 and 5, which are notched on the under side to receive the blades and transversely grooved on their upper sides to allow the deforming of the blades within the groove for the purpose of fastening them.

Means for keeping and spacing the blades in any desired pattern of non-parallel nature may include the employment of members placed between the blades to separate them, and other members, arranged at farther intervals along the tool, to cause the separated blades to converge and be kept together. When separate members are disposed between blades for this purpose then these members may be welded to the blades.

If it be desired, the spacing members may be dispensed with, and blade number one may be drawn to blade number two and while firmly held in such position, by the use of a jig or suitable clamp, these blades may be welded together at predetermined intervals; and between these intervals there may be a further welding of number two blade with that next beyond it in the assembly. This would result in an assembly presenting a pattern roughly resembling that of expanded metal lath when the entire assembly is spread and handles are attached for holding the assembly in the spread position. This would result in a very flexible tool, but one having not quite the strength of the tool made in keeping with Figs. I to V, or in keeping with Figs. VI or VII.

Where bolts and spacers or bolts and washers are used to tie the assembly of saw blades together in any pattern desired such arrangement can be effected by following the disclosure and construction in Fig. VII.

Whatever means may be employed for varying the pattern of the saw blades and for holding them together, the important thing to be carried in mind is that the blades shall not be arranged in strict parallel relation. They should be arranged to present any pattern suitable to effect the objects here intended, and to prevent the grooving and cutting of the surface being conditioned. This may be effected by having the tool made broader at one end than the other, so that a substantially fan-like pattern is presented. But in any event, the most effective design and pattern is one in which the several blades are not kept parallel.

The affixing of appropriate handles to the tool is a matter of choice with the manufacturer; and any suitable type of handle or handles may be employed for this purpose. It is well to have these handles removable, so that when one blade assembly has become worn out the handles may be taken off and attached to a new blade assembly. Likewise the keepers may be re-used in making a new blade assembly, after the worn out blades have been removed therefrom.

By the use of a suitable reciprocating power tool my invention may be operated by mechanical power instead of manually. To do this it is only required that an appropriate reciprocating member of the power tool be attached to the blade assembly so that it may be rapidly moved back and forth over the surface being conditioned.

The operation of this device should be obvious from the foregoing specification and from an examination of the drawings. With a little practice an operator soon learns how much pressure is best applied to the tool, how long a stroke is best, and in what direction the tool should be moved to cause a uniformly conditioned surface.

Ordinarily it is found that light pressure is sufficient; and it is generally best to move the tool in an oblique direction; although moving the tool straight ahead will result in satisfactory performance.

Much longer strokes are ordinarily employed in the manual operation of this tool than is the case when it is driven by a reciprocating power attachment. It will be found that the generous spacing between the blades will not allow the cuttings to accumulate and the tool will continue to operate cleanly at all times. It will not "gum up" as a file usually does, or as sandpaper will do.

On a perfectly flat surface the cutting teeth of this tool will be found all in a common plane. But the tool is flexible; and slight pressure on one edge or corner of the tool will deflect the entire saw assembly, so that the teeth are not longer in a common plane; and the surface worked upon may be followed in its contours.

If the handle 26 be inclined slightly to one side or the other, and if the knob 27 be firmly kept against the surface being conditioned, or if it be tipped in the other direction, then the tool will be found to safely follow the contours of surfaces which are not flat, as in the general curvature of an automobile fender or body, for instance. This feature of flexibility is of great importance, and it distinguishes this tool from the common run of files and planing devices.

This tool can be used as well for dressing wood and fiber materials as for metal. It finds a very broad use in conditioning plastic surfaces and materials.

The tool is made with various grades and numbers of teeth. Usually a relatively coarse toothed tool is employed for the first surfacing operation. This then may be followed by a tool having many more and smaller teeth; and finally a finishing tool with very fine teeth will put a smooth surface on the materials being conditioned. Such matters are left to the needs of the operator and the technical requirements of the job, especially in light of the character of the materials being dressed down.

From the foregoing description and from the drawings it may be collected that I have presented a surface conditioning tool which may be operated manually or by power; and it is flexible enough to follow the general contours of un-level surfaces. The tool will render smooth and uniform the surfaces of metals, plastics, compositions and wood. It will not buck, jump, or chatter, regardless of the direction of its movement, the pressure put upon it, or its speed. It will not groove or deface the surface irregularly; and, on the other hand, the surface will be left in a uniform and even condition. The serrated edges of the tool will not and cannot clog up with materials removed from the surface being conditioned.

I claim:

1. In a surface conditioning tool, a plurality of saw blades arranged back to back widthwise with their toothed edges in a common plane; keepers arranged across said blades, said keepers being provided with transverse slots receiving the back edges of these blades, and each such keeper having a longitudinal groove crossing the slots therein; and deformities so provided along the back edges of said blades as to secure them in said slots and in said grooves.

2. In a surface conditioning tool, a plurality of saw blades arranged in spaced relation; spacing members arranged across the backs of said blades, said members being provided with transverse slots receiving the back edges of the blades, and each such spacing member having a longitudinal groove crossing the slots therein; means provided on the back edges of said blades to secure them in position and in spaced relation; and a locking rod held in a groove against the blades.

CARROLL W. BRYAN.

REFERENCES CITED

The following references are of record in the file of this patent:

UNITED STATES PATENTS

| Number | Name | Date |
|---|---|---|
| 1,011,916 | Carlson | Dec. 19, 1911 |
| 1,100,544 | Densmore | June 16, 1914 |
| 1,356,151 | Jackson | Oct. 19, 1920 |
| 1,603,678 | Furey | Oct. 19, 1926 |
| 1,856,887 | Scheppy | May 3, 1932 |
| 1,939,876 | Cohen | Dec. 19, 1933 |
| 2,059,945 | Hare | Nov. 3, 1936 |
| 2,103,499 | Seifried | Dec. 28, 1937 |